United States Patent
Shazly

(10) Patent No.: US 8,799,719 B2
(45) Date of Patent: *Aug. 5, 2014

(54) ON DEMAND TRACING OF APPLICATION CODE EXECUTION

(75) Inventor: Hassan A. Shazly, Columbia, SC (US)

(73) Assignee: International Business Machines Corporation, Armonk, NY (US)

( * ) Notice: Subject to any disclaimer, the term of this patent is extended or adjusted under 35 U.S.C. 154(b) by 392 days.

This patent is subject to a terminal disclaimer.

(21) Appl. No.: 13/110,919

(22) Filed: May 19, 2011

(65) Prior Publication Data

US 2012/0297254 A1    Nov. 22, 2012

(51) Int. Cl.
    *G06F 11/00*    (2006.01)

(52) U.S. Cl.
    USPC ............... 714/45; 714/20; 714/723; 717/120

(58) Field of Classification Search
    CPC ............ G06F 11/3612; G06F 11/3636; G06F 11/3476; G06F 11/364
    USPC ............................... 714/45, 20, 723; 717/120
    See application file for complete search history.

(56) References Cited

U.S. PATENT DOCUMENTS

| | | | |
|---|---|---|---|
| 6,083,281 A | 7/2000 | Diec et al. | |
| 6,282,701 B1* | 8/2001 | Wygodny et al. | 717/125 |
| 6,539,500 B1 | 3/2003 | Kahle et al. | |
| 6,618,775 B1* | 9/2003 | Davis | 710/100 |
| 6,802,054 B2 | 10/2004 | Faraj | |
| 6,826,747 B1 | 11/2004 | Augsburg et al. | |
| 7,065,678 B2* | 6/2006 | Miyayama et al. | 714/39 |
| 7,447,946 B2 | 11/2008 | Mchale et al. | |
| 7,788,543 B2 | 8/2010 | Chen | |
| 7,962,803 B2* | 6/2011 | Huber et al. | 714/45 |
| 8,042,007 B1* | 10/2011 | Chan et al. | 714/45 |
| 8,291,417 B2 | 10/2012 | Xu et al. | |
| 8,307,343 B2* | 11/2012 | Chaudhuri et al. | 717/128 |
| 2002/0055830 A1* | 5/2002 | Swoboda et al. | 703/19 |
| 2002/0162055 A1* | 10/2002 | Kurooka et al. | 714/45 |
| 2002/0199172 A1* | 12/2002 | Bunnell | 717/128 |
| 2003/0120980 A1 | 6/2003 | Harris | |
| 2004/0059525 A1* | 3/2004 | Davis | 702/45 |

(Continued)

OTHER PUBLICATIONS

IBM, "Host On-Demand tracing checklist," http://publib.boulder.ibm.com/infocenter/hodhelp/v10r0/index.jsp?topic=/com.ibm.hod.doc/doc/troubleshoot/pd_traces.html; (author and date unknown); all pages.

(Continued)

*Primary Examiner* — Loan L. T. Truong
(74) *Attorney, Agent, or Firm* — North Shore Patents, P.C.; Michele Liu Baillie

(57) ABSTRACT

On demand tracing of application code execution includes: during the execution of the application code, writing trace statements to a circular trace buffer (at a selected and potentially variable detail level); determining whether a pre-defined trigger event has occurred; in response to determining that the trigger event has occurred, outputting one or more trace statements in the circular trace buffer according to pre-defined trace parameters; determining whether a trigger end event has occurred; and in response to determining that the trigger end event has occurred, terminating the outputting of the trace statements. The trigger event and the trigger end event may be defined by names of application code variables, values for the variables, and operators to be used. The trigger end event may further be defined by a time duration for which trace statements are to be outputted, or a number of trace statements to be outputted.

6 Claims, 6 Drawing Sheets

(56) References Cited

U.S. PATENT DOCUMENTS

| | | |
|---|---|---|
| 2004/0117690 A1 | 6/2004 | Andersson |
| 2004/0243894 A1* | 12/2004 | Smith et al. .................... 714/724 |
| 2004/0250164 A1 | 12/2004 | Ahmad et al. |
| 2005/0034017 A1* | 2/2005 | Airaud et al. ................... 714/25 |
| 2005/0060521 A1* | 3/2005 | Wang ............................ 712/227 |
| 2005/0132337 A1* | 6/2005 | Wedel et al. ................... 717/128 |
| 2005/0166098 A1 | 7/2005 | Davis |
| 2005/0210447 A1* | 9/2005 | Bradley et al. ................. 717/120 |
| 2006/0085688 A1* | 4/2006 | Satoh ............................. 714/38 |
| 2006/0095674 A1 | 5/2006 | Twomey |
| 2006/0251416 A1* | 11/2006 | Letner et al. .................... 398/45 |
| 2007/0168730 A1* | 7/2007 | Memmi ........................... 714/30 |
| 2007/0226544 A1* | 9/2007 | Woodhouse .................... 714/45 |
| 2008/0010550 A1* | 1/2008 | Agarwala ........................ 714/45 |
| 2008/0126828 A1* | 5/2008 | Girouard et al. .................. 714/2 |
| 2008/0134148 A1 | 6/2008 | Clark |
| 2008/0141226 A1* | 6/2008 | Girouard et al. .............. 717/128 |
| 2008/0216054 A1* | 9/2008 | Bates et al. .................... 717/125 |
| 2008/0244327 A1 | 10/2008 | Coombes et al. |
| 2008/0307203 A1* | 12/2008 | Bell et al. ...................... 712/210 |
| 2009/0222646 A1* | 9/2009 | Ohba et al. .................... 712/227 |
| 2009/0319963 A1 | 12/2009 | Gehman |
| 2010/0218051 A1* | 8/2010 | Walker et al. ................... 714/45 |
| 2010/0257510 A1* | 10/2010 | Horley et al. .................. 717/128 |
| 2010/0332909 A1* | 12/2010 | Larson ............................ 714/40 |
| 2011/0029823 A1* | 2/2011 | Horley et al. ................... 714/45 |
| 2011/0314342 A1* | 12/2011 | Gilkerson et al. .............. 714/45 |
| 2012/0159452 A1* | 6/2012 | DeLine et al. ................. 717/125 |
| 2012/0233500 A1* | 9/2012 | Roettgermann et al. ........ 714/25 |

OTHER PUBLICATIONS

"Prosody guide: application tracing," http://www.aculab.com/support/pdf_documents/v6_linux/ting/pubdoc/trace_app.html#tod; (author and date unknown); all pages.

"Trace Listeners and Switches"; http://www.hesab.net/book/asp.net/Additional%20Documents/Trace%20Listeners%20and%20Switches.pdf, (author and date unknown); all pages.

Larus, J.R., "Efficient Program Tracing", Computer Issue Date, May 1993, vol. 26 Issue 5, pp. 52-61; http://ieeexplore.ieee.org/xpl/freeabs_all.jsp?reload=true&arnumber=211900; Abstract.

IBM, "Host On-Demand tracing checklist," http://publib.boulder.ibm.com/infocenter/hodhelp/v10r0/index.jsp?topic=/com.ibm.hod.doc/doc/troubleshoot/pd_traces.html; Jul. 2005; all pages.

"Prosody guide: application tracing", http://www.aculab.com/support/pdf_documents/v6_linux/ting/pubdoc/trace_app.html#tod; Mar. 8, 2011; all pages.

"Trace Listeners and Switches"; http://www.hesab.net/book/asp.net/Additional%20Documents/Trace%20Listeners%20and%20Switches.pdf; Dec. 5, 2003; all pages.

* cited by examiner

| Parameter | Example Values | Description |
| --- | --- | --- |
| trace | On, Off | Turn trace on or off |
| traceLevel | 1,2,3,4,5 | Level of tracing detail to write |
| traceBuffer | 100 | Number of trace statements to store in circular trace buffer |
| traceStatementSize | 300 | Maximum number of bytes per trace statement |
| traceFileName | \traces\Trace2.out | Full file name for output file |
| Trigger Event: One or more occurrences of following set of three parameters | | |
| triggerName | reponseTime | Name of variable to be used as trigger event |
| triggerOperator | GT | Operator to be used (GT LT GE LE EQ NE IN, between max, min, unique, null) |
| triggerValue | 5 | Value that will cause trigger to be activated |
| triggerLogic | AND | Operand that is placed between multiple triggers to create |
| traceBefore | 15 | Number of trace statements from before trigger event to be outputted |
| traceAfter | 20 | Number of trace statements from after trigger event to be outputted |
| traceTime | 6 | Number of seconds for which outputting of trace statements is to continue |
| traceAfterFreq | 5 | Number of trace statements to be output at a time |
| traceClose | No, Yes | Set whether output file is closed or left open after output performed to file. |
| Trace End Event: One or more occurrences of following set of three parameters | | |
| triggerEndName | numberOfUsers | Name of variable to be used as trigger to terminate outputting of trace statements |
| triggerEndOperator | LT | Operator to be used (GT LT GE LE EQ NE IN, between max, min, unique, null) |
| triggerEndValue | 200 | Value that will cause outputting of trace statements to be terminated |
| triggerEndLogic | AND | Operand that is placed between multiple triggers to create 'complex' logical statement |

FIG. 4

ON DEMAND TRACING OF APPLICATION CODE EXECUTION

BACKGROUND

Tracing software program execution is an excellent tool used for debugging code and understanding execution flows in a test environment. Tracing can also be used in a production environment for problem determination. In the production environment, a problem may be the code (e.g. code paths, code path sequences that were abnormal or unexpected), the input data (e.g. values that are incorrect, out of range or unexpected) or the general computing environment (lack of memory, central processing unit (CPU) cycles, Direct Access Storage Device (DASD), or network throughput).

Especially for long running tasks or daemons, tracing in the production environment produces large quantities of data. Thus, the tracing becomes problematic in that the trace output can cause the program execution to slow down, which may prevent the production system from meeting its service goals. Further, for intermittent problems, tracing must remain on for a long time in order to gather useful data. DASD storage can become an issue, and collecting large quantities of trace data requires extra time, disk and memory to analyze.

BRIEF SUMMARY

According to one embodiment of the present invention, a method for tracing execution of application code, comprises: during the execution of the application code, writing trace statements to a circular trace buffer by a computing device; determining whether a pre-defined trigger event has occurred by the computing device; in response to determining that the trigger event has occurred, outputting one or more trace statements in the circular trace buffer by the computing device according to pre-defined trace parameters; determining whether a trigger end event has occurred by the computing device; and in response to determining that the trigger end event has occurred, terminating the outputting of the trace statements by the computing device.

In one aspect of the present invention, the trigger event is defined by parameters comprising a name of a variable in the application code to be used as the trigger event, a value for the variable, and an operator defining a relationship between the variable and the value for the variable, wherein the determining whether the trigger event has occurred by the computing device comprises: determining whether the variable in the application code satisfies the operator and the value by the computing device.

In one aspect of the present invention, the pre-defined trace parameters comprise before-trigger-event parameters, wherein the before-trigger-event parameters comprise a traceBefore parameter defining a number of trace statements in the circular trace buffer from before the trigger event to be outputting, wherein the outputting of the plurality of trace statements in the circular trace buffer by the computing device in response to determining that the trigger event has occurred, comprises: in response to determining that a trigger event type of the trigger event comprises a new outputting of trace statements, outputting a current trace statement by the computing device, and outputting the traceBefore number of trace statements in the circular trace buffer from before the trigger event by the computing device.

In one aspect of the present invention, the pre-defined trace parameters comprise after-trigger-event parameters, wherein the after-trigger-event parameters comprises a traceAfterFreq parameter defining a number of trace statements in the circular trace buffer from after the trigger event to be outputting at a time, wherein the outputting of the trace statements in the circular trace buffer by the computing device according to the pre-defined trace parameters comprises: in response to determining that a trigger event type of the trigger event comprises an in-progress outputting of trace statements, determining whether a number of trace statements currently in the circular trace buffer is greater than or equal to the traceAfterFreq parameter by the computing device; and in response to determining that the number of trace statements currently in the circular trace buffer is greater than or equal to the traceAfterFreq parameter, outputting the trace statements currently in the circular trace buffer by the computing device.

In one aspect of the present invention, the trigger end event comprises a trace end event, the trace end event is defined by parameters comprising a name of a variable in the application code to be used as the trace end event, a value for the variable, and an operator defining a relationship between the variable and the value for the variable, wherein the determining whether the trigger end event has occurred by the computing device and the terminating of the outputting of the trace statements by the computing device in response to determining that the trace end event has occurred comprises: determining whether the variable in the application code satisfies the operator and the value by the computing device; and in response to determining that the variable in the computer program satisfies the operator and the value by the computing device, terminating the outputting of the trace statements by the computing device.

In one aspect of the present invention, the pre-defined trace parameters comprise a traceTime parameter defining a time duration for which the outputting of the trace statements is to continue, wherein the determining whether the trigger end event has occurred by the computing device and the terminating of the outputting of the trace statements by the computing device in response to determining that the trace end event has occurred, comprises: determining whether the time duration defined by the traceTime parameter has elapsed by the computing device; and in response to determining that the time duration defined by the traceTime parameter has elapsed, terminating the outputting of the trace statements by the computing device.

In one aspect of the present invention, the pre-defined trace parameters comprise a traceAfter parameter defining a number of trace statements from after the trigger event to be outputted, wherein the determining whether the trigger end event has occurred by the computing device and the terminating of the outputting of the trace statements by the computing device in response to determining that the trace end event has occurred, comprises: determining whether a number of outputted trace statements from after the trigger event equals the traceAfter parameter by the computing device; and in response to determining that the number of outputted trace statements from after the trigger events equals the traceAfter parameter, terminating the outputting of the trace statements by the computing device.

In one aspect of the present invention, the terminating of the outputting of the trace statements by the computing device in response to determining that the trigger end event has occurred, comprises: outputting the trace statements currently in the circular trace buffer and the current trace statement by the computing device.

System and computer program products corresponding to the above-summarized methods are also described and claimed herein. In one aspect of the present invention,

BRIEF DESCRIPTION OF THE SEVERAL VIEWS OF THE DRAWINGS

FIG. 4 illustrates example trace parameters according to an embodiment of the present invention.

DETAILED DESCRIPTION

Figure 1:
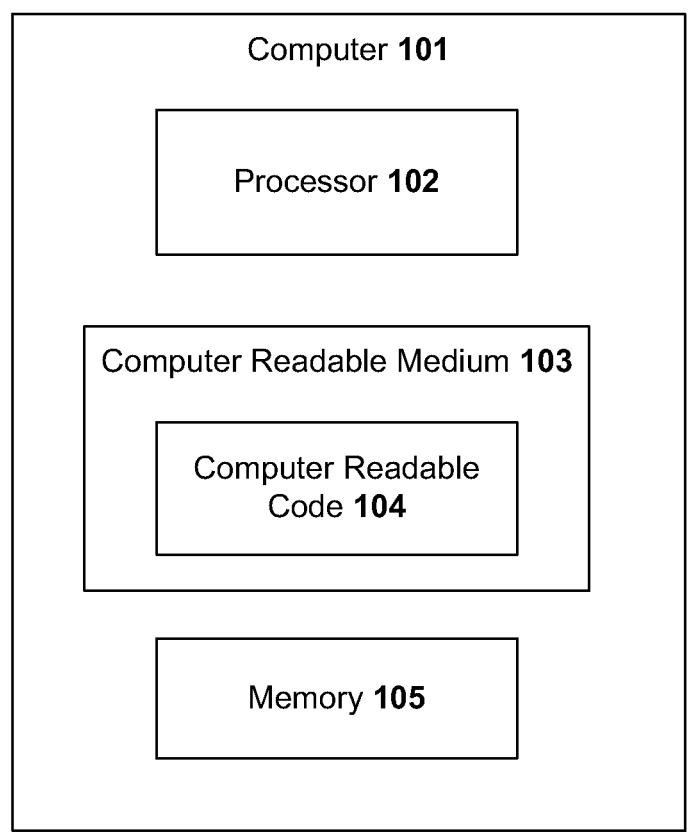
FIG. 1 illustrates an embodiment of a system for providing on demand tracing according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for providing on demand tracing according to the present invention. The system comprises a computer 101 operationally coupled to a processor 102, a computer readable medium 103, and memory 105. The computer readable medium 103 stores computer readable program code 104. The processor 102 executes the program code 104 to provide the on demand tracing according to the various embodiments of the present invention.

The embodiments of the method for on demand tracing allows for the output of specified trace statements within the application code based on the application's behavior. The output of trace data is initiated by a defined trigger event. When a trigger event occurs, the output of trace data begins, and some predetermined number of trace statements before and after the trigger event is output. When a defined trace ending event occurs, the output of trace data is terminated while the application code continues to execute. If another trigger event occurs, then data is once again output until the trace ending event occurs. This process may continue until the running of the application ends, either normally or abnormally.

Figure 2:
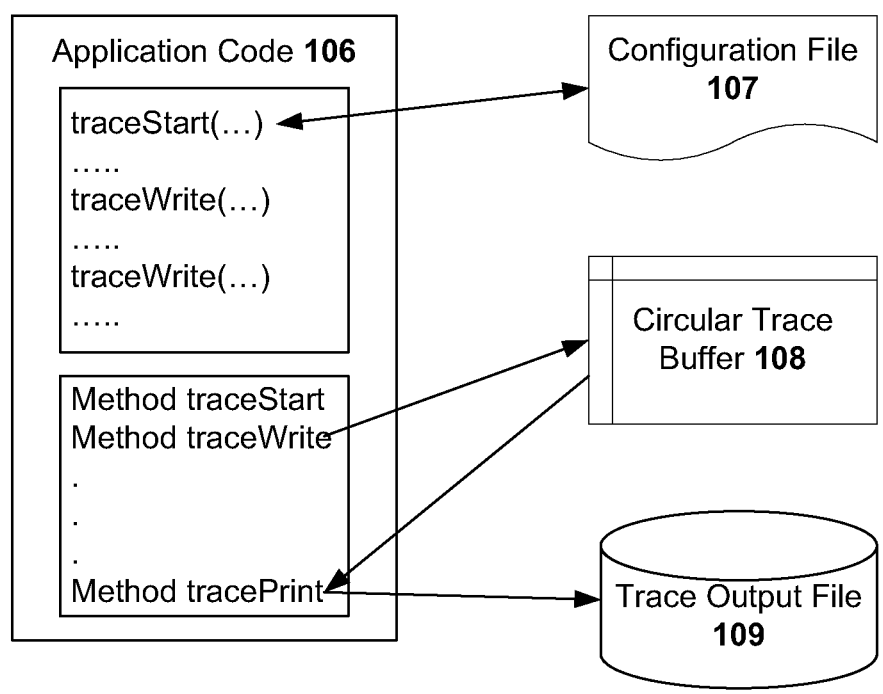
FIG. 2 illustrates a logical block diagram of an embodiment of the system for on demand tracing according to the present invention.

FIG. 2 illustrates a logical block diagram of an embodiment of the system for on demand tracing according to the present invention. The system comprises an application code 106 and a configuration file 107. The application code 106 is stored on the computer readable medium 103 and comprises trace statements hardcoded within. The configuration file 107 contains tracing parameters necessary for controlling the on demand tracing, as described in more detail below. In this embodiment, the application code 106 includes start-up code that invokes a traceStart method. The traceStart method reads the configuration file 107 to obtain the trace parameters and initializes the trace logic according to the trace parameters. Trace statements in the application code 106 invoke the traceWrite method. The trace Write method writes the trace statements into a circular trace buffer 108 in the memory 105. The tracePrint method contains logic which determines when and the manner in which the trace statements are outputted, according to the trace parameters. For example, the tracePrint may output trace statements to a trace output file 109 in persistent storage, also known as "writing to disk". Other manners of outputting the trace statements may be used, for example, outputting to a printer. Although the present invention is described here with the traceStart, traceWrite, and tracePrint methods, other ways of implementing their respective functions may be used without departing from the spirit and scope of the present invention.

Figure 3:
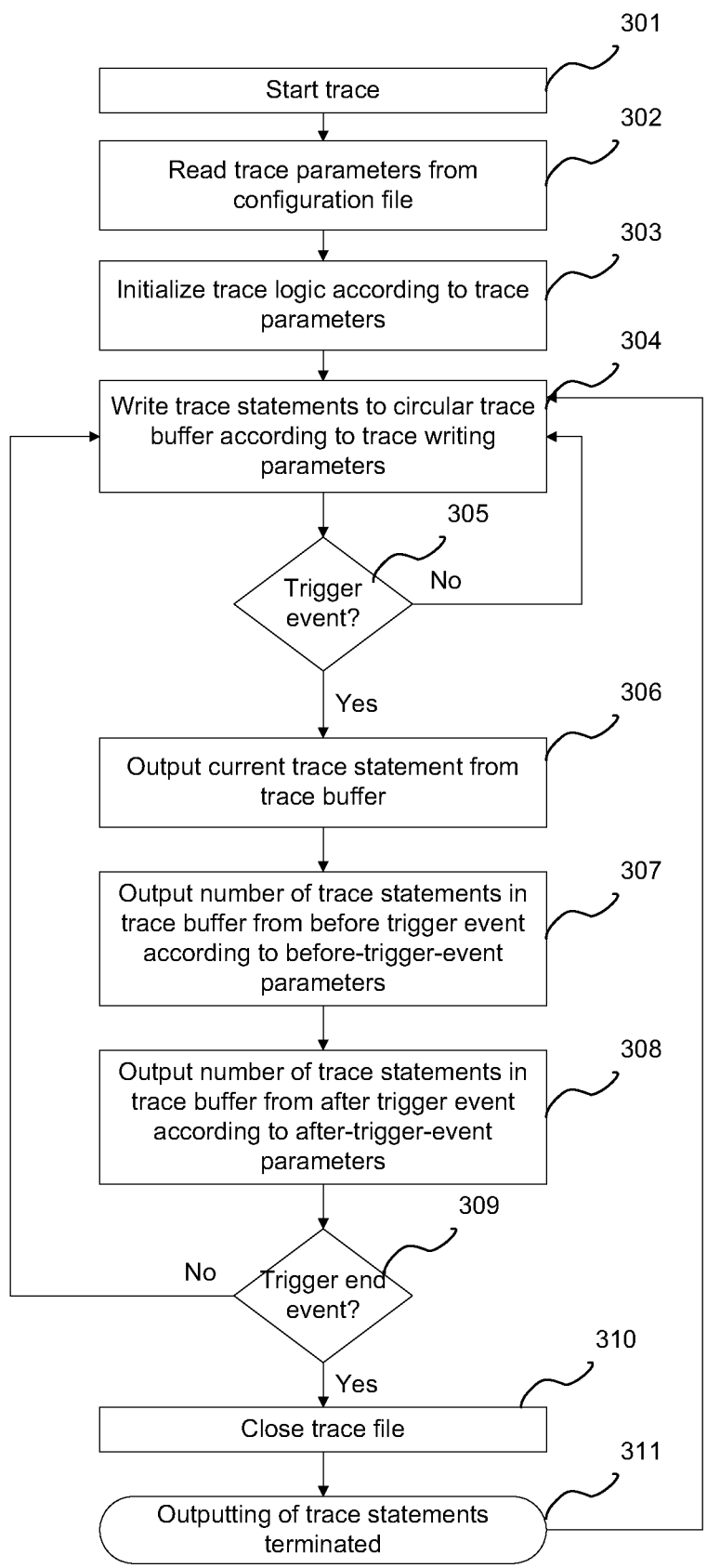
FIG. 3 is a flowchart illustrating an embodiment of a method for on demand tracing according to the present invention.

FIG. 3 is a flowchart illustrating an embodiment of a method for on demand tracing according to the present invention. During execution of the application code 106, the trace is started (301). In this embodiment, the trace starts with the invocation of the traceStart method by start-up code in the application code 106. The trace parameters are read from the configuration file 107 (302), and the trace logic is initialized according to the trace parameters (303). In this embodiment, the traceStart method reads the trace parameters from the configuration file 107, and initializes the trace logic in the other methods, for example through the use of global variables.

The trace parameters comprise trace writing parameters, one or more trigger events, before-trigger-event parameters, after-trigger-event parameters, and one or more trace end events. The trace writing parameters control the writing of trace statements to the circular trace buffer 108. The trigger event defines when the trace statements in the circular trace buffer 108 are outputted. A trigger event is an event which may indicate that a problem is or has occurred during the execution of the application code 106. The before-trigger-event parameters and the after-trigger-event parameters control the outputting of the trace statements from the circular trace buffer 108. The trace end event defines when the outputting of trace statements is terminated.

As the application code 106 executes, trace statements are written to the circular trace buffer 108 (304). In this embodiment, trace statements in the application code 106 calls the traceWrite method, which writes the trace statement to the circular trace buffer 108. The traceWrite method in turn calls the tracePrint method. In this embodiment, the tracePrint method has been initialized with the logic to determine whether a trigger event has occurred. In response to determining that a trigger event has occurred (305), the current trace statement is output from the circular trace buffer 108 (306). Also output from the circular trace buffer 108 is the number of trace statements from before the trigger event according to before-trigger-event parameters (307). The number of trace statements in the circular trace buffer 108 from after the trigger event is further output according to after-trigger-event parameters (308). The outputting of the trace statements from the circular trace buffer 108 continues according to the after-trigger-event parameters until a trigger end event occurs (309). In this embodiment, the tracePrint method has the logic to determine the occurrence of a trigger end event as defined in the configuration file 107. In response to determining that a trigger end event has occurred, the outputting of trace statements is terminated (311). If the outputting is to the trace output file 109, the trace output file 109 is closed upon the termination of the outputting of trace statements (310). Note that the writing of trace statements to the circular trace buffer 108 continues as long as the application code 106 continues to execute, regardless of whether an outputting of trace statements is in progress.

FIG. 4 illustrates example trace parameters according to an embodiment of the present invention. Illustrated in FIG. 4 are the example trace parameters, example values, and a description. Example trace writing parameters include: "trace", traceLevel, traceBuffer, traceStatementSize, and traceFileName. The "trace" parameter turns the trace either on or off. The setting of the "trace" parameter allows for tracing to be started and stopped depending on environmental conditions. The traceLevel parameter controls the level of tracing detail to write to the circular trace buffer 108. For example, a traceLevel=1 may be defined as writing only error messages, a traceLevel=5 may be defined as writing a detailed trace, and traceLevels 2-4 would progress in detail between traceLevels 1 and 5. The traceLevel value may be changed as environmental conditions change. For example, if the responseTime variable in the application code 106 is being traced, then the traceLevel may initially be set to 1. If the responseTime becomes greater than 3 seconds, then the traceLevel may be increased to capture more detailed information. If the responseTime later falls down below 3 seconds, the traceLevel may be changed back to a lower level.

The traceBuffer parameter controls the number of trace statements to store in the circular trace buffer 108 at a time. For example, with traceBuffer=100, a maximum of 100 trace statements are stored in the circular trace buffer 108 at a time. These 100 trace statements would be continuously overwritten with new trace statements. The traceStatementSize parameter controls the maximum number of bytes for each trace statement. For example, with traceStatementSize=300, each trace statement is limited to a maximum of 300 bytes. The traceFileName parameter defines the full file name of the trace output file 109, if any, to which the trace statements are written.

In this embodiment, the trigger event is defined by one or more occurrences of three parameters: triggerName; triggerOperator; and triggerValue. The triggerName parameter controls the name of the variable in the application code 106 to be used as a trigger. The triggerValue parameter controls the value of the variable defined by the triggerName parameter that will cause the outputting of trace statements to be activated. The triggerOperator parameter controls the operator that will be used to define the relationship between the triggerName and trigger Value parameters. Example operators include: GT (greater than); LT (less than); GE (greater than or equal to); LE (less than or equal to); EQ (equals); NE (not equal to); between; max; min; unique; and null. The operators may be operators as defined by a programming language, or the operators may be custom operators created by the application programmer in the form of a function, method, or subroutine.

The set (triggerName, triggerOperator, triggerValue) identifies the specific parameters and the corresponding conditions under which they act as trigger events, causing the outputting of trace statements to start. For example, assume the following:

> triggerName = responseTime;
> triggerOperator = GT; and
> triggerValue = 5.

The above specified parameters and their values result in the following logic triggering the start of the outputting of trace statements: responseTime>5. Thus, if for example the variable responseTime in the application code 106 is set to "6 seconds" during the execution of the application code 106, the tracePrint method would determine that a trigger event has occurred. If more than one triggerName is specified, then the triggerLogic parameter specifies the logical grouping of the individual triggerName parameters to form a complex trigger event. For example, assume the following:

> triggerName = responseTime;
> triggerOperator = GT;
> triggerValue = 5;
> triggerName = userID;
> triggerOperator = EQ;
> triggerValue = john; and
> triggerLogic = AND.

The above specified parameters and their values result in the following logic triggering the start of tracing: responseTime>5 AND userID=john.

In this embodiment, the before-trigger-event parameters include the traceBefore parameter. The after-trigger-event parameters include: traceAfter; traceTime; traceAfterFreq; and traceClose. The traceBefore parameter controls the number of trace statements from before the trigger event to be outputted. This number cannot exceed the traceBuffer value. The traceAfter parameter controls the number of trace statements from after the trigger event to be outputted. This number can be greater than the traceBuffer value. The traceTime parameter controls the number of seconds after the trigger event for which the outputting of trace statements is to continue. The traceAfterFreq parameter controls the number of trace statements to be output at a time. This number cannot exceed the traceBuffer value. For example, traceAfterFreq=5 would cause the output of trace statements once 5 new trace statements had accumulated in the circular trace buffer 108. If the application code 106 is expected to crash after a trigger event, then the traceAfterFreq may be set at a low value. If the trigger event is not expected to crash the application code 106, then the traceAfterFreq may be set at a higher value, lowering the amount of I/O overhead incurred. The traceClose parameter controls whether the trace output file 109 is closed or left open every time a write is performed to the file. Closing the output file each time a trace statement is written ensures that the trace data will not be lost if a catastrophic application failure occurs.

In this embodiment, the trace end event is defined by one or more occurrences of three parameters: triggerEndName; triggerEndOperator; and triggerEndValue. The triggerEndName parameter identifies the variable in the application code 106 to be used as a trigger to terminate the outputting of trace statements. The triggerEndValue parameter specifies the value of the variable defined by the triggerEndName parameter that will cause the outputting of trace statements to end. The triggerEndOperator parameter controls the operator that will be used to define the relationship between the triggerEndName and the triggerEndValue parameters. Example operators include: GT (greater than); LT (less than); GE (greater than or equal to); LE (less than or equal to); EQ (equals); NE (not equal to); between; max; min; unique; and null. The operators may be operators as defined by a programming language, or the operators may be custom operators created by the application programmer in the form of a function, method, or subroutine. The triggerEndName value may or may not be the same as the triggerName value. For example, the outputting of trace statements may be set to start if responseTime>5 seconds but may be terminated if numberOfUsers<200. The triggerEndLogic parameter controls the value that will cause the outputting of trace statements to be terminated. If more than one trace end event is specified, a triggerEndLogic parameter specifies the logical grouping of the individual trace end events to create a complex trace end event. For example, a trace end event may be defined for trigger events where the application code 106 later recovers from the trigger conditions on its own. The recovery may be defined as the trace end event, thus capturing conditions during the recovery period.

Thus, in this embodiment, there are three possible trigger end events: defining an amount of time for which the outputting of trace statements continues by setting the traceTime parameter; defining a number of trace statements from after the trigger event to output by setting the traceAfter parameter; or by the occurrence of a trace end event by setting the triggerEndName, triggerEndOperator, triggerEndValue, and optionally the triggerEndLogic parameters.

Figure 5:
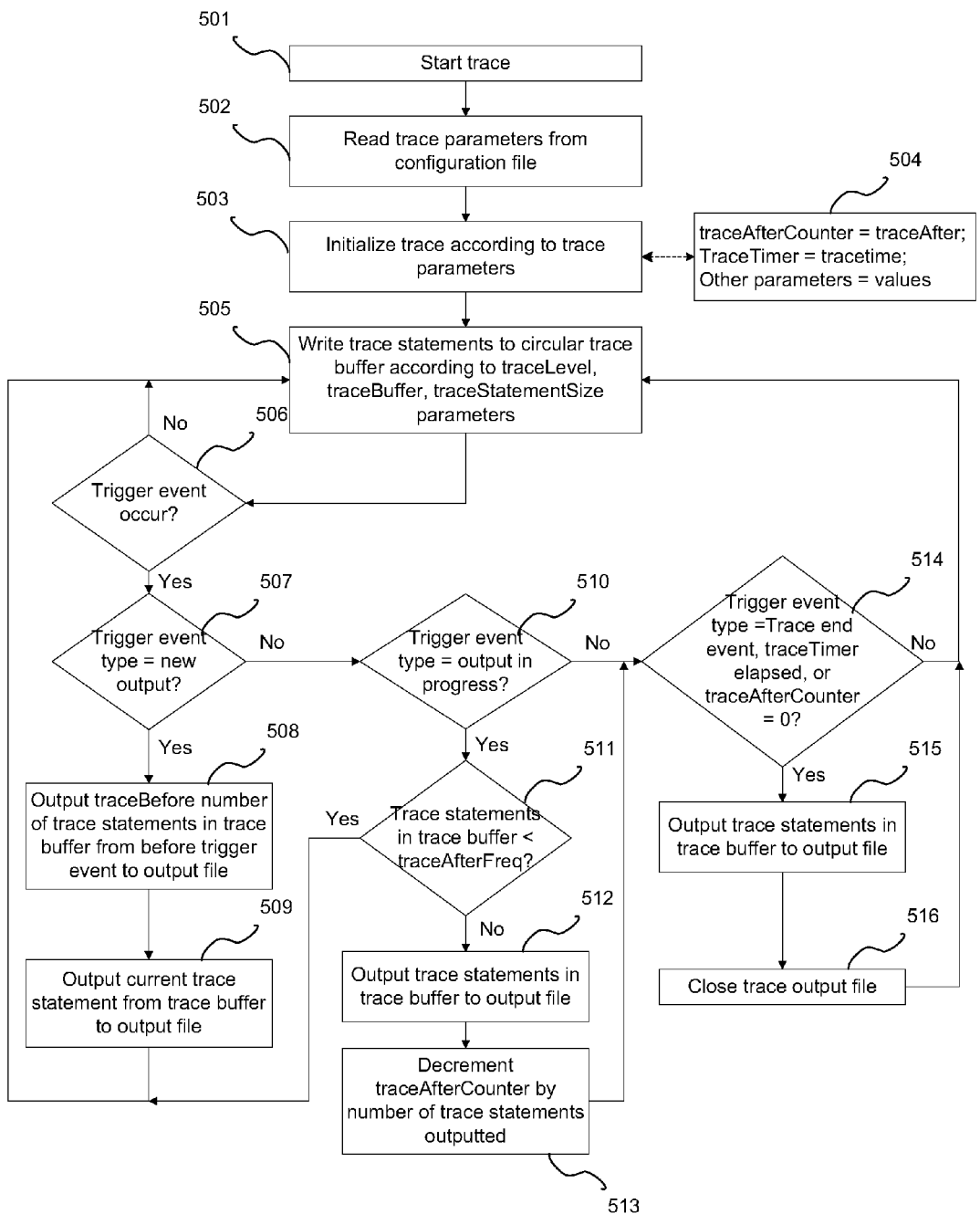
FIG. 5 is a flowchart illustrating in more detail an embodiment of a method for on demand tracing according to the present invention.

FIG. 5 is a flowchart illustrating in more detail an embodiment of a method for on demand tracing according to the present invention. During execution of the application code 106, traceStart is invoked, starting the trace (501). The traceStart method reads the trace parameters from the configuration file 107 (502), and the trace logic is initialized according to the trace parameters (503). For example, if a value for the traceAfter parameter is defined, then a traceAfterCounter value would be set equal to the traceAfter value. If a value for the traceTime parameter is defined, then a traceTimer value is set equal to the traceTime value. The initialization of the trace logic further includes the setting up of a table of conditions that stores the values of the various trace parameters read from the configuration file 107 (504).

As the trace statements in the application code 106 calls the traceWrite method, trace statements are written to the circular trace buffer 108 (505). The writing of the trace statements to the circular trace buffer 108 are controlled by the trace, traceLevel, traceBuffer, TraceStatementSize and traceFileName parameters. Each time the traceWrite method writes a trace statement to the circular trace buffer 108, the traceWrite method in turn calls the tracePrint method. The tracePrint method has been initialized with the logic to determine whether a trigger event has occurred, as defined by the triggerName, triggerOperator, triggerValue, and triggerLogic parameters. The tracePrint method determines whether a trigger event has occurred (506). In response to determining that a trigger event has occurred, the tracePrint method determines the type of trigger event. In response to determining that the trigger event type is a new outputting of trace statements (507), the tracePrint method outputs the traceBefore number of trace statements in the circular trace buffer 108 from before the trigger event (508) and the current trace statement from the circular trace buffer 108 to the output file 109 defined by traceFileName (509). In the case where the trigger event occurs before the outputting of trace statements in response to a previous trigger event has ended the tracePrint method determines that the trigger event type is an in-progress outputting of trace statements (510). In response, the tracePrint method determines whether the number of trace statements in the circular trace buffer 108 is less than traceAfterFreq (511). In response to determining that the number of trace statements in the circular trace buffer 108 is less than traceAfterFreq, no trace statements are output, and new statements continue to be written to the circular trace buffer 108 (505). In response to determining that the number of trace statements in the circular trace buffer 108 is greater than or equal to traceAfterFreq (511), the trace statements are output from the circular trace buffer 108 to the trace output file 109 (512). The tracePrint method then decrements the traceAfterCounter by the number of trace statements outputted in step 512 (513).

In response to determining that the trigger event type is not a new outputting of trace statements (507) nor an in-progress outputting of trace statements (510), the tracePrint determines whether the trigger event type is the occurrence of a trigger end event. A trigger end event may be the occurrence of a trace end event, the elapsing of the traceTimer, or the traceAfterCounter=0 (514). A trace end event is defined by the triggerEndName, triggerEndOperator, triggerEndValue, and optionally the triggerEndLogic parameters, and the tracePrint method is initialized during the start of the trace (503) with the logic to determine whether the trace end event has occurred. In response to determining that a trigger end event has occurred, the tracePrint method outputs the trace statements in the circular trace buffer 108 to the trace output file 109 (515). The tracePrint method then closes the trace output file 109 (516), which terminates the outputting of trace statements. Note that the writing of trace statements to the circular trace buffer 108 continues as long as the application code 106 continues to execute, regardless of whether an outputting of trace statements is in progress.

In this embodiment, trace statements may be written to the circular trace buffer 108 either formatted or not formatted. When formatted, the trace statements are converted to a predefined output format and then written to the circular trace buffer 108. When not formatted, the trace statements are written to the circular trace buffer 108 as raw trace data, which is formatted at the time of output. The writing of unformatted trace statements requires less resources and each trace statement requires less buffer space. Further, since not all trace statements written to the circular trace buffer 108 are outputted, fewer conversions to the output format are required.

Figure 6:
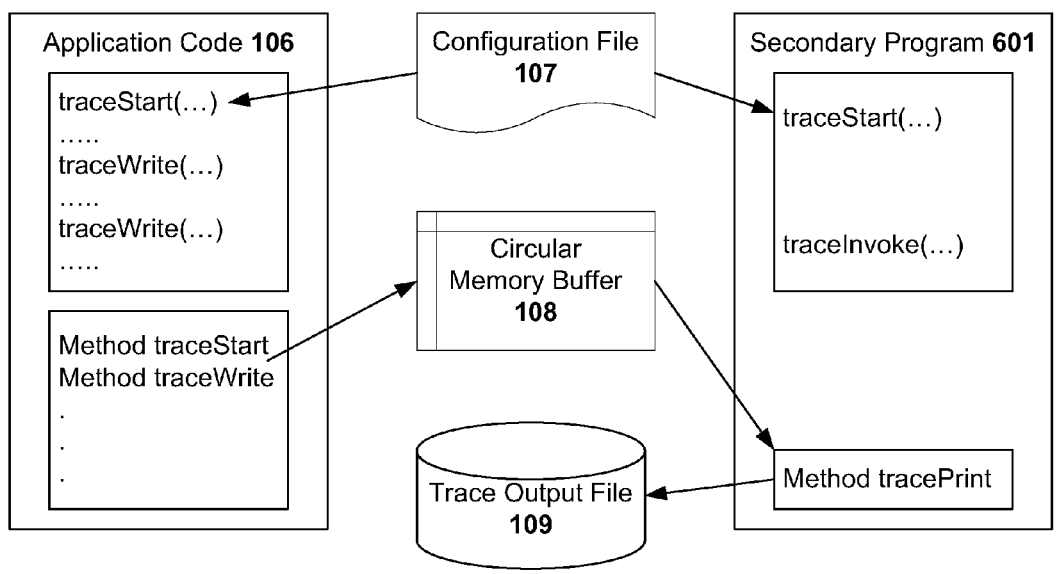
FIG. 6 illustrates a logical block diagram of an alternative embodiment of a system for on demand tracing according to the present invention.

FIG. 6 illustrates a logical block diagram of an alternative embodiment of a system for on demand tracing according to the present invention. In this embodiment, the tracePrint method is invoked by a secondary program 601 that shares access to the configuration file 107 and the circular trace buffer 108 with the application code 106. The tracePrint method performs the outputting of the trace statements in the same manner as set forth above. With the embodiment illustrated in FIG. 2, if the application code 106 suffers a catastrophic failure at the time of a trigger event, or during the outputting of trace statements in response to the trigger event, trace statements in the circular trace buffer 108 at the time of failure may be lost since the invocation of the tracePrint method would cease. With the embodiment illustrated in FIG. 6, since the tracePrint method is invoked by a secondary program 601, the tracePrint method may continue outputting trace statements from the circular trace buffer 108 even after the catastrophic failure of the application code 106.

The secondary program may be prompted to invoke the tracePrint method using a variety of mechanisms, including but not limited to: polling, shared interrupt, or shared control variables. With polling, the tracePrint method periodically examines the circular trace buffer 108 to determine if any of the conditions has occurred that calls for the outputting of trace statements. With a shared interrupt, when the traceWrite method writes a trace statement to the circular trace buffer 108, an interrupt is triggered. The secondary program 601 sees the interrupt and examines the circular trace buffer 108 to determine if any of the conditions has occurred that calls for the outputting of trace statements. With shared control variables, the control variables are stored in shared memory (not shown), and both the application code 106 and the secondary program 601 can access the shared control variables. By examining the values of the shared control variables, the tracePrint method may determine if any of the conditions has occurred that calls for the outputting of trace statements.

On demand tracing as described above may be useful in a production environment. For example, consider a server application that has intermittent performance issues. The high response times may occur occasionally at a specific customer location and may be difficult to replicate in a test environment. Using the on demand tracing of the present invention, the trace parameters may be defined for the conditions which may lead to the intermittent performance issues. For example, if the intermittent performance issue includes a high response time, and the server application code contains the variable "responseTime", then "responseTime>5" may be defined as the trigger event. This would cause the outputting of trace statements to be triggered when the server application response time is greater than 5 seconds. The other trace parameters described above may be specified to control how (see traceLevel parameter above) and how many of the trace statements are outputted. This captures the trigger event itself and the conditions that led to the occurrence of the trigger event. The outputting of the trace statements that occur after the trigger event may aid in understanding how long the condition persisted and what occurred during any recovery period.

With the on demand tracing of the present invention, tracing may run continuously with the application code 106 in a production environment. If a trigger event does not occur, then no trace statements are outputted from the circular trace buffer 108. When no trace statements are outputted, only the overhead of writing trace statements to the circular trace buffer 108 is incurred.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer program product for tracing execution of application code, the computer program product comprising:
   a computer readable storage hardware having computer readable program code embodied therewith, the computer readable program code configured to:
   execute the application code comprising a plurality of trace statements encoded within:
   in response to executing a current trace statement within the application code, write the current trace statement to a circular trace buffer and determine whether a pre-defined trigger event has occurred; and
   in response to determining that the trigger event has occurred,
   output the current trace statement from the circular trace buffer,
   output from the circular trace buffer a number of trace statements before the trigger event according to a pre-defined before-trigger-event parameter, and
   output from the circular trace buffer a number of trace statements after the trigger event until a trigger end event has occurred according to a pre-defined after-trigger-event parameter,
   wherein the trigger end event comprises a trace end event, wherein the trace end event is defined by parameters comprising a name of a variable in the application code to be used as the trace end event, a value for the variable, and an operator defining a relationship between the variable and the value for the variable,
   wherein the computer readable program code configured to output from the circular trace buffer the number of trace statements after the trigger event until the trigger end event has occurred according to the pre-defined after-trigger-event parameter is further configured to:
   determine whether the variable in the application code satisfies the operator and the value; and
   in response to determining that the variable in the application code satisfies the operator and the value, terminate the outputting of the trace statements from the circular buffer.

2. A computer program product for tracing execution of application code, the computer program product comprising:
   a computer readable storage hardware having computer readable program code embodied therewith, the computer readable program code configured to:
   execute the application code comprising a plurality of trace statements encoded within:
   in response to executing a current trace statement within the application code, write the current trace statement to a circular trace buffer and determine whether a pre-defined trigger event has occurred; and
   in response to determining that the trigger event has occurred,
   output the current trace statement from the circular trace buffer,
   output from the circular trace buffer a number of trace statements before the trigger event according to a pre-defined before-trigger-event parameter, and
   output from the circular trace buffer a number of trace statements after the trigger event until a trigger end event has occurred according to a pre-defined after-trigger-event parameter,
   wherein the computer readable storage hardware further comprises a traceTime parameter defining a time duration for which the outputting of the trace statements from the circular buffer is to continue,
   wherein the computer readable program code configured to output from the circular trace buffer the number of trace statements after the trigger event until the trigger end event has occurred according to the pre-defined after-trigger-event parameter is further configured to:
   determine whether the time duration defined by the traceTime parameter has elapsed; and
   in response to determining that the time duration defined by the traceTime parameter has elapsed, terminate the outputting of the trace statements from the circular buffer.

3. A computer program product for tracing execution of application code, the computer program product comprising:
   a computer readable storage hardware having computer readable program code embodied therewith, the computer readable program code configured to:
   execute the application code comprising a plurality of trace statements encoded within:
   in response to executing a current trace statement within the application code, write the current trace statement to a circular trace buffer and determine whether a pre-defined trigger event has occurred; and
   in response to determining that the trigger event has occurred,
   output the current trace statement from the circular trace buffer, output from the circular trace buffer a number of trace statements before the trigger event according to a pre-defined before-trigger-event parameter, and output from the circular trace buffer a number of trace statements after the trigger event until a trigger end event has occurred according to a pre-defined after-trigger-event parameter, wherein the computer readable storage hardware further comprises a traceAfter parameter defining the number of trace statements from after the trigger event to be outputted from the circular buffer, wherein the computer readable program code configured to output from the circular trace buffer the number of trace statements after the trigger event until the trigger end event has occurred according to the pre-defined after-trigger-event parameter is further configured to:

determine whether the number of trace statements after the trigger event outputted from the circular buffer equals the traceAfter parameter; and in response to determining that the number of outputted trace statements after the trigger event equals the traceAfter parameter, terminate the outputting of the trace statements from the circular buffer.

4. A system comprising:
a processor;
a circular trace buffer; and
a computer readable storage medium having computer readable program code embodied therewith, the computer readable program code configured to:

execute application code comprising a plurality of trace statements encoded within;

in response to executing a current trace statement, write the current trace statement to the circular trace buffer during the execution of the application code and determine whether a pre-defined trigger event has occurred; and in response to determining that the trigger event has occurred, output the current trace statement from the circular trace buffer, output from the circular trace buffer a number of trace statements before the trigger event according to a pre-defined before-trigger-event parameter, and output from the circular trace buffer a number of trace statements after the trigger event until a trigger end event has occurred according to a pre-defined after-trigger-event parameter, wherein the trigger end event comprises a trace end event, wherein the trace end event is defined by parameters comprising a name of a variable in the application code to be used as the trace end event, a value for the variable, and an operator defining a relationship between the variable and the value for the variable, wherein the computer readable program code configured to output from the circular trace buffer the number of trace statements after the trigger event until the trigger end event has occurred according to the pre-defined after-trigger-event parameter is further configured to:

determine whether the variable in the application code satisfies the operator and the value; and in response to determining that the variable in the application code satisfies the operator and the value, terminate the outputting of the trace statements from the circular buffer.

5. A system comprising:
a processor;
a circular trace buffer; and
a computer readable storage medium having computer readable program code embodied therewith, the computer readable program code configured to:

execute application code comprising a plurality of trace statements encoded within;

in response to executing a current trace statement, write the current trace statement to the circular trace buffer during the execution of the application code and determine whether a pre-defined trigger event has occurred; and in response to determining that the trigger event has occurred, output the current trace statement from the circular trace buffer, output from the circular trace buffer a number of trace statements before the trigger event according to a pre-defined before-trigger-event parameter, and output from the circular trace buffer a number of trace statements after the trigger event until a trigger end event has occurred according to a pre-defined after-trigger-event parameter, wherein the computer readable storage medium further comprises a traceTime parameter defining the time duration for which the outputting of the trace statements from the circular buffer is to continue, wherein the computer readable program code configured to output from the circular trace buffer the number of trace statements after the trigger event until the trigger end event has occurred according to the pre-defined after-trigger-event parameter is further configured to:

determine whether the time duration defined by the traceTime parameter has elapsed; and in response to determining that the time duration defined by the traceTime parameter has elapsed, terminate the outputting of the trace statements from the circular buffer.

6. A system comprising:
a processor;
a circular trace buffer; and
a computer readable storage medium having computer readable program code embodied therewith, the computer readable program code configured to:

execute application code comprising a plurality of trace statements encoded within;

in response to executing a current trace statement, write the current trace statement to the circular trace buffer during the execution of the application code and determine whether a pre-defined trigger event has occurred; and in response to determining that the trigger event has occurred, output the current trace statement from the circular trace buffer, output from the circular trace buffer a number of trace statements before the trigger event according to a pre-defined before-trigger-event parameter, and output from the circular trace buffer a number of trace statements after the trigger event until a trigger end event has occurred according to a pre-defined after-trigger-event parameter, wherein the computer readable storage medium further comprises a traceAfter parameter defining the number of trace statements after the trigger event to be outputted from the circular buffer, wherein the computer readable program code configured to output from the circular trace buffer the number of trace statements after the trigger event until the trigger end event has occurred according to the pre-defined after-trigger-event parameter is further configured to:

determine whether the number of trace statements after the trigger event outputted from the circular trace buffer equals the traceAfter parameter; and in response to determining that the number of outputted trace statements after the trigger event equals the traceAfter parameter, terminate the outputting of the trace statements from the circular buffer.

\* \* \* \* \*